United States Patent Office 3,322,565
Patented May 30, 1967

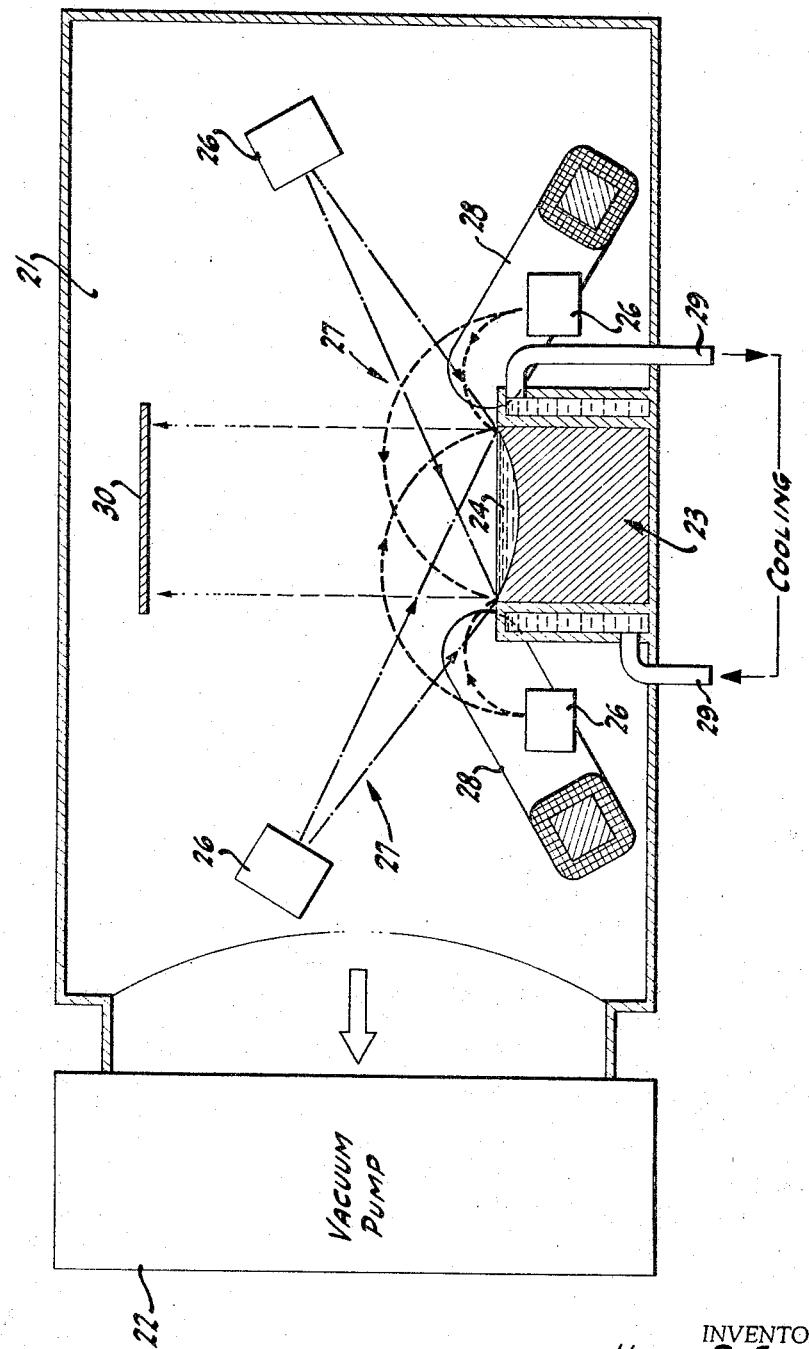

3,322,565
POLYMER COATINGS THROUGH ELECTRON BEAM EVAPORATION
Hugh R. Smith, Jr., Piedmont, Calif., assignor to Temescal Metallurgical Corporation, Berkeley, Calif., a corporation of California
Filed Sept. 8, 1965, Ser. No. 492,969
10 Claims. (Cl. 117—106)

This application is a continuation-in-part of copending application Ser. No. 216,784, filed Aug. 14, 1962, and now abandoned.

This invention relates generally to a method of coating a substrate with a plastic coating, and more particularly it relates to a vacuum evaporation method of coating a substrate with a thin uniform coating of a synthetic organic polymer.

Plastic-coated articles and containers, particularly in packaging, are becoming more and more prevalent. A glance at supermarket shelves reveals plastic-coated milk cartons, freezer containers, dairy products containers, packages for cleaning materials, and many more. Plastic coatings are also useful as protective coating, for example, over a previously deposited metallic coating. Heretofore, plastic-coated articles have been manufactured by well-known techniques, such as dipping, spraying, rolling, or brushing the container with a solution of the plastic. Generally, coatings applied using these techniques are relatively thick and are not as smooth and uniform as might be desired. Because of the large volume of plastic coated articles produced, application of a thick coating of plastic is a costly way to achieve the requisite uniformity. In addition, thick coatings applied to the interior of a carton often peels and contaminate the contents of the container.

Evaporative coating processes have long been used for applying a metal coating to the surface of a substrate. These processes generally involve heating the metal in a vacuum to a sufficient temperature to cause it to evaporate. The resulting metal vapors are condensed on the surface of the substrate. This method of applying a metal coating is known to provide a highly satisfactory, thin, uniformly dispersed coating of the metal on the surface of the substrate.

Because of the high reliability of vacuum evaporation coating methods, it would be extremely desirable to vaporize a plastic material, i.e., a synthetic organic polymer and deposit the vaporized polymer material upon a suitable substrate utilizing a vacuum evaporation method. However, it has been found that heating causes most polymers to decompose before they evaporate sufficiently for coating purposes. In fact, it is widely known that the large-molecule synthetic polymers of chief interest for plastic coating have no appreciable vapor pressure, even in a vacuum, at temperatures below their decompositon temperature. Recombination of a decomposed vaporized plastic material on the surface of a substrate may possibly by promoted by electron bombardment of the deposited coating, but the quantitative effects of these factors are unknown at present. And it is not possible to obtain a uniform organic polymer coating on the surface of a substrate when the polymer has been decomposed. The decomposition products, if decomposition temperature is reached, form an undersirable deposit on the substrate, if in fact they are condensible at the substrate temperature. More often, the decomposition products fail to form any deposit whatsoever because they are gases at the substrate temperature. It has, therefore, been commonly believed in the art that vacuum evaporation processes are not applicable to coating a substrate with a synthetic organic plastic.

It is a principle object of the present invention to provide a method for coating a substrate with a synthetic organic polymer. It is a further object of the invention to provide a method of coating a substrate with a synthetic organic polymer utilizing vacuum vaporization techniques.

Other objects and advantages of the invention will become apparent from the following detailed description, and from the accompanying drawing which represents a schematic elevational view, partly in section, of one form of apparatus for carrying out the method of the invention.

Generally, the present invention is directed to a vacuum evaporation method of coating a substrate with a synthetic organic polymer, comprising bombarding a synthetic organic polymer maintained in a vacuum at a temperature below its decomposition temperature with high energy electrons of sufficient intensity to cause vapors to sublime from the surface of the polymer material at a suitable rate for coating a substrate. The sublimed polymer vapors are deposited on the surface of a substrate in the form of a thin uniform polymer coating. In accordance with the method of the present invention a thin, uniform, polymer coating is provided on the substrate.

The reasons for the unexpected success of the electron-bombardment process of this invention are not entirely understood. One possible explanation is that a fragmentation process occurs. Analysis of the polymer deposited on the surface of the substrate clearly shows that the coating is not usually a decomposition product, such as would be obtained by heating the polymer to above its decomposition temperature. Moreover, in accordance with the present invention, the polymer material that is bombarded with the electrons, as well as the substrate, is kept below the polymer decomposition temperature during bombardment of the polymer material with high energy electrons. It is believed, although the present invention is not considered to be limited thereto, that bombardment of the polymer material by high energy electrons breaks some of the chemical bonds within the polymer molecule resulting in the formation of polymer fragments which sublime from the surface of the polymer material. It is known that the bond strength between the atoms of a long chain polymer molecule is relatively low, for example, from 15 to 50 kilocalories. It is believed that when the surface of a polymer is struck by high energy electrons, which have ample excess energy to break these bonds, the polymer molecules are broken into a number of fragments of relatively short chain length which have reactive terminal groups. The solid polymer material is heated by bombardment with the high energy electrons to a temperature sufficiently high for the polymer fragments to evaporate in the high vacuum environment above the solid polymer material but below the decomposition temperature of the polymer. At this elevated temperature, the polymer fragments sublime from the surface of the solid polymer material in the form of a vapor which is deposited on the surface of the substrate.

When the reactive short chain fragments are deposited on the surface of the substrate they react with one another reforming a high molecular weight long chain polymer, which polymer is formed on the substrate in the form of a thin uniform adherent coating. The polymer formed on the surface of the substrate may have the same or substantially the same molecular structure, or may have a different molecular structure, as the polymer bombarded with the high energy electrons.

The particular substrate upon which the synthetic organic polymer coating is deposited is not a critical feature of the invention. Selection of the substrate depends almost entirely upon the requisite for the coated product.

Generally, glass, paper, various plastics, metal, wood, and so forth are used. Furthermore, previously coated materials may be coated again with the same or different substances to form striated materials. For example, when aluminum-coated paper is plastic-coated in accordance with the present invention, the aluminum is protected by the plastic, making a more durable product.

In accordance with the present invention, all but a few of the known synthetic organic polymers, copolymers, hetropolymers and mixtures thereof may be vaporized to provide thin uniform synthetic organic polymer coatings on the surface of a substrate. The polymer may be a condensation polymer or copolymer, or may be an addition polymer or copolymer. As used herein, the term "polymer" is intended to include all forms of polymers, copolymers and mixtures of polymers and copolymers and the like.

The polymer should be a solid at ambient conditions, or should form on the surface of the substrate a polymer which is a solid at ambient conditions. The only known synthetic organic polymers which may not be employed within the scope of the invention are those which break down at the conditions necessary in order to provide for breaking of the polymer molecule into fragments. It is believed that these polymers are not decomposed, but rather that the fragments that are formed are gaseous at the operating conditions and do not have active terminal radicals which would cause the fragments to recombine on the surface of the substrate. Examples of such synthetic organic polymers which do not provide useful coatings within the scope of the invention are the polyvinyl polymers containing chlorine atoms, for example, vinylchloride and vinylidenechloride polymers and copolymers, and polymers formed by a reaction with formaldehyde, for example, phenol formaldehyde, urea formaldehyde and melamine formaldehyde. In vinyl polymers containing chlorine, the bond between the carbon atom and the chloride atom is particularly weak, and it is believed that the energies necessary in order to break the vinylchloride polymer into short chain length fragments also breaks the bond between the carbon atom and the chlorine atom, thus forming noncondensible hydrogen chloride. However, halogen containing polymers other than vinyl polymers, such as tetrafluoroethylene and chlorotrifluoroethylene polymers and copolymers, and vinyl polymers containing fluorine do not yield significant amounts of noncondensible halogen acids upon exposure to high energy electrons and are useful within the scope of the present invention. Hydrocarbon polymers and acrylonitrile polymers are also of limited utility in the method of the present invention.

In some instances evolution of noncondensible gases, principally hydrogen, methane and low molecular weight alkanes may occur during bombardment of the polymer material with high energy electrons. The evolution of these noncondensible gases may be compensated for by bleeding into the vacuum system amounts of the particular evolved gases for recombination with the sublimed short chain fragments on the surface of the substrate.

Suitable condensation polymers which may be employed include polymers formed from cellulose derivatives, for example, cellulose nitrate and cellulose acetate; polyamide polymers, for example, the various nylons; polyester polymers, including alkyd polymers and polyterphthalates, i.e., Mylar; polyether polymers, such as the various epoxy polymers, polyoxyolefin polymers, for example, polyoxyethylene and polyoxpropylene; polyurethane polymers; and silicone polymers formed from siloxanes.

Suitable examples of addition polymers useful within the scope of the invention include polymers formed from polyacrylate polymers such as Plexiglas; polyfluoroolefin polymers such as polytetrafluoroethylene and polychlorotrifluoroethylene; polyolefin polymers formed from unsaturated hydrocarbons containing ethylene or diene groups, for example, polyethylene, polypropylene, polyisobutylene and other poly-1-olefins, and polydienes, e.g., polybutadiene, polyisoprene, poly - 2 - chlorobutadiene; polystyrene polymers; polyvinyl polymers, such as polyvinyl alcohol, polyvinyl acetate, polyvinyl ethers, and polyvinyl fluoride. Various copolymers and hetropolymers are also possible. In many instances, desired compositions include copolymers of the various polyvinyl resins with other polyvinyl resins or with styrene resins. Other synthetic organic polymers that may be utilized within the scope of the present invention include cross-linked polymers, for example, various forms of epoxy resins, various of the alkyd resins which may be cross-linked with unsaturated fatty acids, Mylar, and so forth.

One embodiment of an apparatus for carrying out the method of the invention is shown in the attached drawing. An evacuated chamber 21 is maintained at a low pressure by evacuating means 22, for example, a high vacuum diffusion pump. The pressure within the chamber is usually less than one millitorr, and preferably less than 0.5 millitorr. A crucible 23 is suitably placed within the chamber 21 for receiving a solid polymer material 24 to be sublimed. The exposed upper surface of the polymer is bombarded with high energy electrons from an electron source 26. One suitable source of high energy electrons is an electron beam gun which directs an electron beam 27 onto the upper surface of the polymer material 24. In the illustrated example, these sources are placed both above and below the crucible 23. Suitable beam deflecting devices 28, shown schematically, are used to deflect the lower beams onto the upper surface of the polymer material 24. These are conventional and usually are magnetic fields which curve the path of the electron beam. Of course, fewer beam sources can be used if desired. The beam intensity required varies with the type of polymer; in practice, it has been found that the beam power density at the surface of the plastic should be at least ½ kw./sq. in. to achieve a reasonable coating rate. In practice, an electron beam having a potential form about 30 to 20,000, preferably 1,000 to 15,000 volts, is usually used to achieve a beam power density at the surface of the plastic of about 1 to 5 kw./sq. in. Higher beam power densities, for example, up to 15 kw./sq. in. or higher, may be used; however, higher beam power densities may create X-rays which require shielding to protect the operator. Furthermore, care must be taken so that the beam doesn't cause the plastic to heat to above its decomposition temperature. This is usually avoided by avoiding too high a beam power and by using conventional cooling of the crucibles, such as water through cooling coils 29.

The high energy electrons emitted from the electron gun 26 strike the exposed surface of the polymer material 24. Due to their high energy, the electrons penetrate into the surface of the polymer material a distance equal to several molecular layers. As the electrons strike the polymer molecules on the exposed surface of the polymer material, the high energy level of the electrons causes the long chain polymer molecules to be broken into the described short chain fragments. As the electrons continue into the surface of the polymer material, the electrons strike polymer molecules located beneath the exposed surface of the polymer material, and the polymer molecules below the surface of the polymer material are also broken into fragments. It is believed that each electron that strikes the surface of the polymer material is capable of breaking the bonds of a number of polymer molecules.

The resulting short chain polymer fragments sublime from the solid polymer material 24 and deposit on the lower surface of the substrate 30 placed as shown in the drawing which is maintained at a temperature below the decomposition temperature of the polymer material. The distance between the substrate and the polymer is not critical. Of course, this distance need be sufficient to prevent the substrate from intercepting the electron beam. If desired, the substrate 30 may be heated before, during, or after the deposition in order to change the properties or rate of the deposition of plastic thereupon. This may be accomplished either by using additional electron beams or reflected portions of the same electron beams directed at the substrate 30, or by other alternative heating means known in the art. The composition of the plastic coating can sometimes be affected by these electron beams.

With certain plastics it is found that by-product gases are formed during evaporation. In most instances, these are of a nature so as not to be attracted to the substrate. Hence, they are pumped out of the vacuum chamber through the vacuum pump 22.

It is also possible to employ a plurality of crucibles containing different polymer materials in place of the single crucible shown in the drawing in order to obtain a composite polymer coating on the surface of the substrate. Also, a mixture of polymer material may be placed in a single crucible.

The improved results obtained by use of the method of the present invention are illustrated by the following examples.

*Example I*

A sheet of polyethylene was placed in a crucible within a vacuum chamber which was evacuated to a pressure below about 0.3 millitorr. The polyethylene was then bombarded with electrons from an electron beam gun using a beam power at the surface of the polyethylene of between 8.5 and 10.6 kw. per square inch utilizing a 7500 volt electron beam. A glass substrate was positioned about 10 inches from the crucible containing the polyethylene and a 0.0005 inch thick transparent polyethylene coating was deposited on the surface of the glass substrate. The polyethylene coating was then stripped from the surface of the glass substrate and chemically examined. It was found to be chemically the same polyethylene which was evaporated.

The same polyethylene sample was then heated in a vacuum of 0.3 millitorr using a tantalum resistance heater to cause the polyethylene to be vaporized. Before reaching a temperature at which vaporization occurred, the polyethylene material within the crucible began to bubble and to decompose. An uneven brown decomposition product was deposited on the surface of the substrate. The product was uneven and was not in the form of a coating.

*Examples II to XIII*

Various other synthetic organic polymers were vaporized in accordance with Example I and deposited upon the surface of a glass substrate. The materials utilized, the beam power density and the type of coating obtained are set forth in the following table. The character of the deposited coating was graded on numerical scale with I being the best. In all instances an acceptable uniform polymer coating was obtained on the surface of the substrate.

TABLE I

| Example | Synthetic Organic Polymer | Beam Power Density, kw./sq. in. | Character of Coating |
| --- | --- | --- | --- |
| 2 | Polypropylene | 1 | 1 |
| 3 | Nylon | 1 | 1 |
| 4 | Polytetrafluorethylene | 1 | 2 |
| 5 | Polychlorotrifluorethylene | 1 | 3 |
| 6 | Mylar (polyterphthalate) | 1 | 2 |
| 7 | Silicone rubber | 1 | 2 |
| 8 | Polyurethane | 1 | 2 |
| 9 | Plexiglas (methylmethacrylate) | 1 | 3 |
| 10 | Epon (epoxy) | 1 | 2 |
| 11 | Cellulose acetate | 1 | 2 |
| 12 | Silicone glass | 1 | 3 |
| 13 | Polystyrene | 1 | 2 |

*Example XIV*

A sheet of paper was coated with an inner coating of polyethylene and an outer coating of aluminum in accordance with the prior art methods. The coated sheet was then divided into a number of samples and overcoated with a 0.0005 coating of nylon and polymethylmethacrylate in accordance with Examples 3 & 9 respectively. These samples were compared against a control sample which was not overcoated by an eraser test, a commonly used test to determine the degree of protection afforded a surface by a particular coating. In the eraser test, the surface of the sample is rubbed with an ordinary pencil eraser using a stroke of constant pressure. The number of strokes required to remove the aluminum coating was determined.

The aluminum coating was removed from the control sample in two strokes, from the nylon overcoated sample in six to seven strokes, and from the polymethylmethacrylate overcoated sample in 25 strokes.

It can be seen that a method has been provided for a coating a substrate with a thin uniform synthetic organic polymer coating using vacuum evaporation techniques. Although certain features of the invention have been set forth with particularity in order to described the invention, other alternatives within the skill of the art are contemplated.

Various of the features of the invention are set forth in the following claims.

What is claimed is:

1. A method of coating a substrate with a synthetic organic polymer coating comprising, maintaining a synthetic organic polymer at a pressure of not more than about 1 millitorr of mercury absolute, said synthetic organic polymer having the characteristics of (1) being able to withstand bombardment by an electron beam without decomposition of the polymer and without formation of excessive amounts of noncondensible gaseous material, (2) being capable of sublimation under bombardment of the electron beam at temperatures below the decomposition temperature of the polymer, (3) the sublimed polymer vapors being capable of condensing upon the surface of a substrate at a temperature below the decomposition temperature of the polymer in the form of a uniform coherent film; bombarding the polymer with an electron beam having a power density at the surface of the polymer of at least about ½ kw./sq. inch while maintaining the temperature of the polymer below its decomposition temperature to cause sublimation of the polymer, and condensing the sublimed vapors on the surface of a substrate maintained at a temperature below the decomposition temperature of the polymer in the form of a uniform coherent polymer coating.

2. A method of coating a substrate with a thin uniform synthetic organic polymer coating comprising, maintaining a solid synthetic organic polymer selected from cellulose derivatives, polyamides, polyesters, polyethers, polyurethanes, silicones, polyacrylates, polyfluoroolefins, polyolefins, polystyrenes or polyvinls other than those containing chloride atoms at a pressure of not more than about 1 millitorr of mercury absolute, bombarding the surface of the organic polymer with an electron beam having a power density at the surface of the organic polymer of between about ½ and about 15 kilowatts per square inch to cause the organic polymer to sublime, maintaining the temperature of the organic polymer below its decomposition temperature, and condensing the sublimed vapors on the surface of a substrate maintained below the decomposition temperature of the organic polymer, whereby a thin uniform synthetic organic polymer coating is provided on the surface of the substrate.

3. The method of claim 2 wherein the synthetic organic polymer is selected from polyethylene, polypropylene, polystyrene, polytetrafluoroethylene, nylon, epoxy or polyterphthalate.

4. The method of claim 3 wherein the beam power density is maintained between about 1 and about 5 kilowatts per square inch.

5. The method of claim 4 wherein the synthetic organic polymer is polyethylene.

6. The method of claim 4 wherein the synthetic organic polymer is polypropylene.

7. The method of claim 4 wherein the synthetic organic polymer is nylon.

8. The method of claim 4 wherein the synthetic organic polymer is polyterephthalate.

9. The method of claim 4 wherein the synthetic organic polymer is epoxy.

10. The method of claim 4 wherein the synthetic organic polymer is polystyrene.

References Cited

UNITED STATES PATENTS

| | | | |
|---|---|---|---|
| 2,447,805 | 8/1948 | Hyman | 117—106 X |
| 2,893,900 | 7/1959 | Machlin | 117—232 |
| 2,932,588 | 4/1960 | Frank | 117—106 |
| 2,970,896 | 2/1961 | Cornelison | 117—106 |
| 3,017,290 | 1/1962 | Rosenthal | 117—106 |
| 3,119,707 | 1/1964 | Christy | 117—106 X |

ALFRED L. LEAVITT, *Primary Examiner.*

RICHARD D. NEVIUS, *Examiner.*

A. GOLIAN, *Assistant Examiner.*